United States Patent [19]
Holt et al.

[11] 3,974,990
[45] Aug. 17, 1976

[54] DUAL EJECTOR STORES ATTITUDE CONTROL SYSTEM

[75] Inventors: Lloyd J. Holt; Clayton Panlaqui, both of Ridgecrest, Calif.

[73] Assignee: The United States of America as represented by the Secretary of the Navy, Washington, D.C.

[22] Filed: July 21, 1975

[21] Appl. No.: 597,869

[52] U.S. Cl. .................... 244/137 R; 60/581; 89/1.5 F; 91/411 A; 92/151
[51] Int. Cl.² .............................................. B64D 1/04
[58] Field of Search ............... 244/137 R; 89/1.5 R, 89/1.5 F, 1.5 G; 294/83 AE; 91/411 A; 92/130 R, 130 A, 151; 60/581

[56] References Cited
UNITED STATES PATENTS

| | | | |
|---|---|---|---|
| 3,059,956 | 10/1962 | Geffner | 244/137 R X |
| 3,610,094 | 10/1971 | Craigie | 244/137 R X |
| 3,883,097 | 5/1975 | Billot | 244/137 R |

*Primary Examiner*—Trygve M. Blix
*Assistant Examiner*—Barry L. Kelmachter
*Attorney, Agent, or Firm*—R. S. Sciascia; Roy Miller; Gerald F. Baker

[57] ABSTRACT

An aircraft stores suspension and release device including extendible ejectors for forcibly ejecting an attached store. The extendible ejectors are hydraulically actuated and dependently connected for positive control and the degree of extension of each ejector is independently adjustable. The extendible ejector may be connected together by mechanical or hydraulic linkage which may be gas, hydraulically or mechanically operated.

7 Claims, 2 Drawing Figures

DUAL EJECTOR STORES ATTITUDE CONTROL SYSTEM

BACKGROUND OF THE INVENTION

The present invention relates to a device for ejecting stores, missiles, bombs and the like from an aircraft and particularly to devices for ejecting such items in a controlled manner so that not only will collision of the items with the aircraft be prevented but also these items may be dispensed in their optimum delivery attitude or otherwise selectively offloaded as, for example, in a jettison mode.

Prior aircraft stores racks incorporating ejection means are exemplified in U.S. Pat. Nos. 2,931,341 and 3,610,094.

A weapons/stores center of gravity should be placed under the ejector piston and the aerodynamic induced moments (caused by the flow field about the aircraft) should be balanced about the center of gravity, or the weapon/store attitude at end of stroke velocity will not be predictable. A current system, using a single piston attempts to overcome this unbalanced condition (when known) by providing various ejector assembly placements within the bomb rack housing. A finite number of placements would be required to meet all ejector requirements due to the variables of unbalance possibilities.

Present dual ejector systems, such as in U.S. Pat. No. 3,610,094, wherein hot gas is supplied to each piston assembly from a single (or dual) source, attempt to overcome these unbalanced moments and system inertias by orificing. The gas pressure is metered to each piston for countering the unbalance moments with unbalanced power distribution. These orifices are subject to erosion and contamination by the hot gas generators (cartridges) and induce variable reaction forces. The gas energy is used for accelerating the weapons/stores and to resist any external rotational forces induced by the flow field.

Current systems, during ejection, are incapable of totally resisting these internal and external unbalanced reaction forces which affect store attitude. These external unbalanced forces cause a time delay (piston acceleration delay) on one piston, due to gas being compressible, but do not delay the piston which moves independently, thereby accentuating an already bad store-to-aircraft separation condition.

SUMMARY OF THE INVENTION

The dual ejector system according to the present invention provides positive pitch attitude control of ejected stores of missiles via paralled ejection or by a controlled variable length ejector stroke. The system has the capability for adjustments of the ejection pressure in the power system prior to the ejection cycle to control ejection forces which then allow the system to move a mass through a predictable/repeatable stroke with control of acceleration, stroke time, and end of stroke velocity. Power is applied to that ejector piston requiring the most force for overcoming system inertia and aerodynamic induced moments and reaction forces without causing an imbalance in attitude control of the store or missile. An induced angular rate of the ejected weapon/store at end of stroke may be achieved, if desired.

DESCRIPTION AND OPERATION

Figure 1:
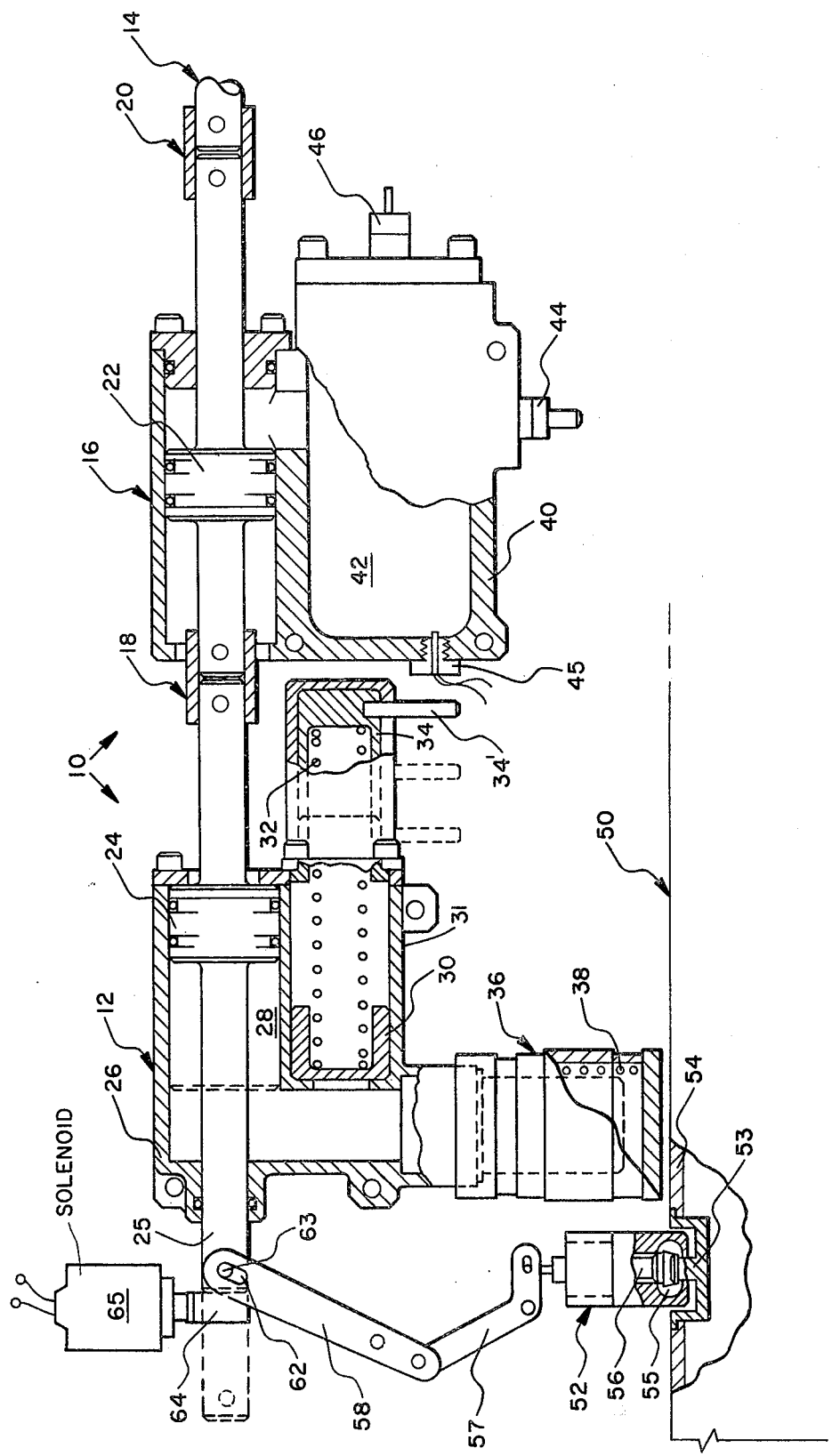
FIG. 1 is a fragmentary side elevation partly in section showing a typical stores rack and ejection system embodying the invention.

An Ejector System assembly according to the present invention is generally indicated at 10 in FIG. 1 and consists of two hydraulic ejector assemblies 12, 14 and a gas pressurized power system 16. Connecting linkages 18, 20 mechanically connect the gas power system output piston 22 with input pistons of the ejector assemblies exemplified by piston 24 of ejector assembly 12. The three pistons are, therefore, movement (ejection stroke) "dependent." The ejector assemblies are identical in form and orientation and, thus, only one is shown in full. The ejector assembly 12, as shown, comprises a housing 26, power input piston 24, hydraulic oil filled chamber area 28, floating piston 30 riding in control cylinder 31 against the bias of spring 32. An adjustable (positionable) stop 34 is provided to preselect the ejection stroke of the piston ejection assembly 36 selectively limiting the travel of piston 30. The floating piston 30, spring 32 and adjustable stop 34 are for pitch attitude and pitch rate control as more fully discussed below.

The gas pressurized power system 16 comprises a housing 40, power output piston 22, gas pressure chamber or vessel 42, pressurizing filler valve 44, pressure sensor 45, and a pressure control bleed valve 46. The gas pressure vessel 42 is pressure filled by a pre-pressured bottle system or an externally pumped source, not shown. The gas pressure system could, of course, be a pre-pressured detachable and re-usable vessel.

The ejector system is designed for combination with a stores rack (not shown) which is equiped to carry a bomb 50, for example attached thereto by conventional lock-on couplings as illustrated at 52. The coupling 52 grips a lug 53 recessed in the bomb casing 54 by means of a plurality of flat C shaped grippers 55 held in the position shown by a spring biased plunger 56. Downward movement of plunger 56 will allow rotary movement of individual grippers 55 and release of bomb 50 from the rack. Downward motion of plunger 56 may be accomplished electrically, hydraulically or mechanically by links 57, 58 for example which are shown pivoted respectively at 59, 60 to the rack and at 61 to each other. Movement of the linkage is accomplished in the device shown by movement of pistons 22, 24 to the left since link 58 is coupled to shaft 25 by a slot 62 engaging pin 63.

Movement of shaft 25 is restrained by stop 64 until it is removed by action of solenoid 65.

Figure 2:
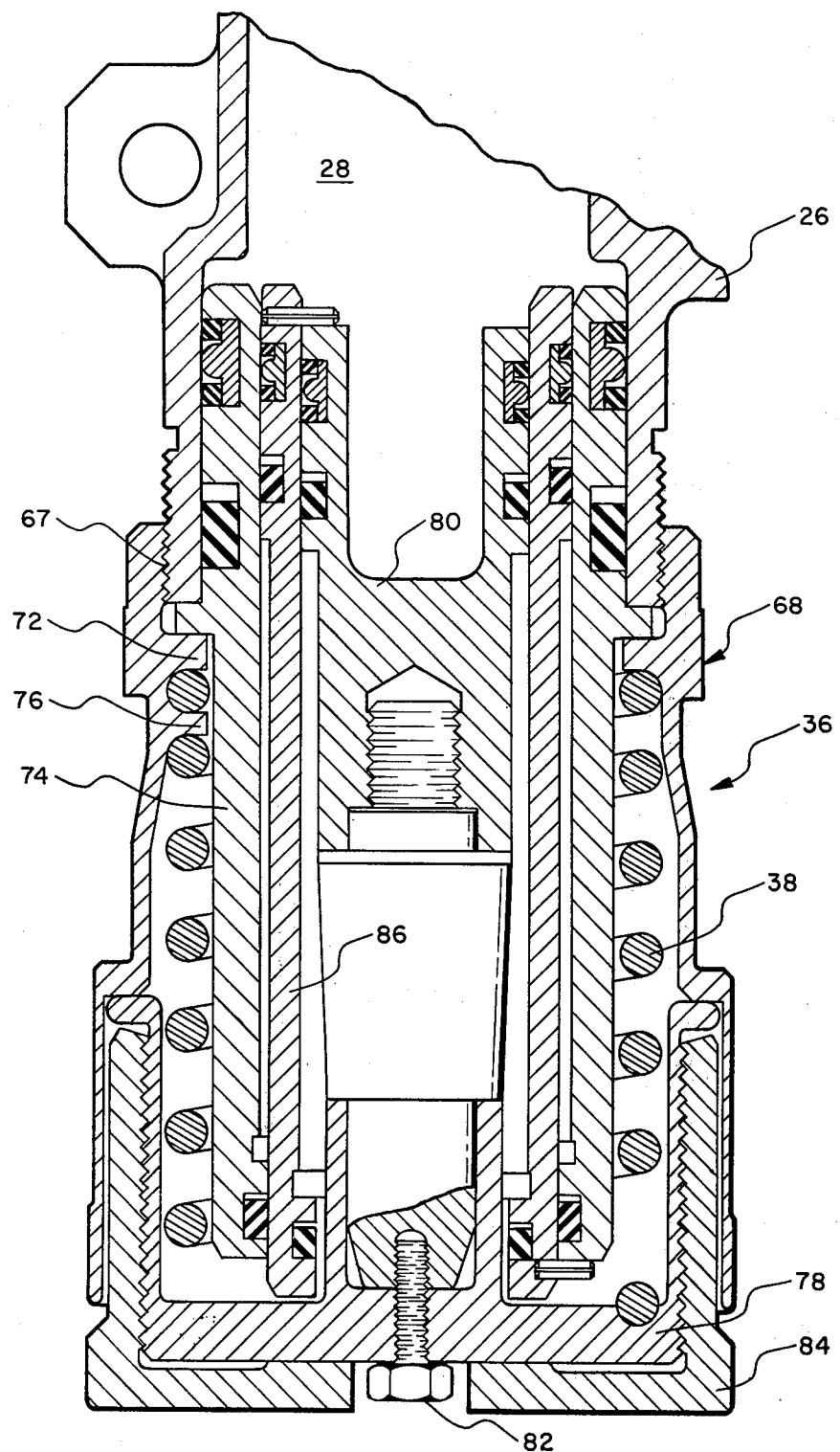
FIG. 2 is an enlarged cross sectional view of a portion of FIG. 1.

The ejection piston assemblies 36 are more clearly illustrated in FIG. 2, which shows one of the assemblies in a view partially broken away and in longitudinal cross-section. The piston assembly 36 as shown is fastened to housing 26 in threaded engagement as shown at 67. A threaded cylindrical adaptor 68 threadedly engages housing 26 and by means of a boss 72 on the inner surface thereof fastens an outer piston 74 rigidly within a bore in housing 26 communicating with chamber 28. A second boss 76 within adaptor 68 cooperates with the first boss 72 to secure the inboard end of return spring 38. The other end of spring 38 is fastened to an end cap 78 which is integrally connected to an inner piston member 80 as by threaded bolt as indicated at 82.

An adjustment cap 84 is threadedly fastened to end cap 78 and an intermediate piston 86 is shown between outer piston 74 and inner piston 80.

OPERATION

Prior to weapon/store loading and aircraft take off, the system is prepared for operation by setting detent stop 64 to restrain movement of piston assemblies 22, 24 (armament system switches, not shown, in the cockpit OFF) and after pressurizing of the power system to maximum operating pressure, the control of the weapons/store ejection forces, attitude control and ejection initiation (weapon release) is performed via the aircraft cockpit and the armament-fire control system. With armament system ON and a weapon type control switch selected from the cockpit, electrical power is supplied to the armament-fire control system and thence to solenoid 65. Activation of the detent solenoid 65 removes the detent stop 64 allowing movement of piston 22, 24 etc.

A basic operation would be for weapon/store ejection without a requirement for pitch attitude adjustment or variable ejection force control. Upon ejection initiation (release signal), the linkage detent stop 64 is released which allows the pressure in the power system 16 to stroke the power piston 22 and both ejector input pistons 24 from the solid line position to the dotted line position. Because of the mechanically coupled dependent linkages 18, 20, the output piston 16 cannot move faster (or slower) than either of the ejector input pistons.

During the stroke, the hydraulic fluid within the housing 26 is displaced, causing the telescoping pistons in assembly 36 to extend. Both piston assemblies being identical and dependent, they extend at the same rate and for the same distance, thereby giving a parallel attitude of the weapon during ejection. At completion of the stroke, the pressure control valve 46 is opened, reducing the pressure in system 16 to zero, allowing the retainer return springs 38 to retract the pistons in assembly 36 to their initial position.

MANUAL OPERATION OF PITCH ATTITUDE AND EJECTOR FORCES

Pitch Attitude Control — When weapon system release requirements require the weapon/store to have a specified attitude (nose up or nose down) at end of stroke, the pitch attitude is set (manually) prior to weapon loading. The adjustable stop 34 is positioned by removing pin 34' and changing the assembly as denoted by dotted line positions for pin 34' as required to select the desired volume of the hydraulic fluid chamber 28. During the stroke cycle of the input piston 24, the floating piston 30 is moved against the pre-positioned stop 34, allowing a portion of the hydraulic fluid to be displaced. This causes a change in the length of the ejection stroke for that assembly and an attitude change in the weapon/store at end of stroke.

Ejector Force Control — To allow for the variability of weapon/store weights, the ejection force should be varied so the correct force for each weapon/store could be used. An ejection force (Chamber pressure) would be established for each weapon/store. Prior to loading of a weapon/store, the power system 16 would be pressurized through the filler valve 44 to that pre-determined value.

AUTOMATIC OPERATION OF PITCH ATTITUDE AND EJECTOR FORCES

For automatic operation of the dual ejector system, the weapon/store release parameters, e.g. pitch attitude and ejection force, would be preprogrammed into the aircraft armament-fire control system. The selection of a weapon type would automatically set the pitch attitude (if required) and the correct ejection pressure.

Pitch Attitude Control — Automatic operation of the adjustable stop 34 may be by an electro/mechanical positionable actuator device. For a particular weapon type, a voltage signal may be employed to set the actuation stop to a pre-determined position. Alternatively a resistance bridge or a series of micro switches may be used for positioning the adjustable stop 34. The operation of the ejector system would be the same as previously defined.

Ejection Force Control — Automatic setting of the power system pressure may be accomplished through a voltage matching arrangement in the armament-fire control system. The output voltage from the pressure sensor 45 may be compared with the weapon/store pre-programmed value. A mismatch of voltages will cause the pressure control valve 46 to open and thus reduce the pressure to the next pressure increment. When a signal match occurs, the remaining pressure in the power system will be optimized for that weapon/store ejection time, end of stroke velocity and acceleration (G's).

We claim:
1. An apparatus adapted to be attached to an aircraft for carrying and forcibly ejecting a store which has means thereon for releasable attachment to said apparatus comprising in combination,
   gripper means for releasably securing the store,
   a source of pressurized fluid,
   cylinder means communicating directly with the source of pressurized fluid,
   a power piston slidably positioned within said cylinder and having a pair of oppositely extended power shafts integral and coaxial therewith,
   first and second fluid motor means each comprising a fluid pressure cylinder and an actuator piston slidably positioned therein and having oppositely extending actuator shafts and one of said actuator shafts of each fluid motor means being respectively attached to one of said oppositely extending power shafts,
   an ejector cylinder communicating directly with said fluid pressure cylinder in each fluid motor means, and
   at least one hollow ejector piston slidably positioned within each said ejector cylinder.
2. The apparatus of claim 1 further including ejector piston stroke adjustment means associated with each said fluid motor means comprising,
   a control cylinder communicating with said fluid pressure cylinder,
   a floating piston in said control cylinder,
   stop means in said control cylinder, and
   spring means between said floating piston and said stop means so that varying the position of said stop means will vary the amount of travel of said floating piston causing varying amounts of fluid to flow from said fluid pressure cylinder into said control cylinder.

3. The apparatus of claim 2 and removable means positioned to selectively block or permit movement of said power piston.

4. The apparatus of claim 3 wherein the pressure in said source of pressurized fluid may be varied as desired.

5. The apparatus of claim 2 wherein the pressure in said source of pressurized fluid may be varied as desired.

6. The apparatus of claim 5 and removable means positioned to selectively block or permit movement of said power piston.

7. The apparatus of claim 1 and removable means positioned to selectively block or permit movement of said power piston.

* * * * *